United States Patent [19]
Lane

[11] 4,109,926
[45] Aug. 29, 1978

[54] UTILITY CART

[76] Inventor: Gilbert M. Lane, 4017 Secor Ave., Bronx, N.Y. 10466

[21] Appl. No.: 675,606

[22] Filed: Apr. 9, 1976

[51] Int. Cl.$^2$ .............................................. B62B 3/02
[52] U.S. Cl. .................................. 280/39; 280/43.24; 280/47.34; 280/651
[58] Field of Search .................. 280/43, 79.1, 79.2, 280/79.3, 38, 39, 641, 642, 643, 646, 47.34, 47.37, 43.24

[56] References Cited

U.S. PATENT DOCUMENTS

| | | | |
|---|---|---|---|
| 526,972 | 10/1894 | Jaimison | 280/38 |
| 2,706,643 | 4/1955 | Babcock | 280/47.37 |
| 3,125,353 | 3/1964 | Gohmann | 280/79.2 X |
| 3,394,942 | 7/1968 | Smith et al. | 280/79.1 R X |
| 3,488,062 | 1/1970 | Walda | 280/43 |
| 3,924,872 | 12/1975 | Sollazzi et al. | 280/47.37 R |

FOREIGN PATENT DOCUMENTS

| | | | |
|---|---|---|---|
| 89,934 | 9/1964 | France | 280/47.34 |

*Primary Examiner*—Joseph F. Peters, Jr.
*Assistant Examiner*—Michael J. Forman
*Attorney, Agent, or Firm*—Robert D. Farkas

[57] ABSTRACT

This disclosure pertains to a rectangular sturdy base provided with four general purpose wheels that are fitted to axles which are hingably attached to the base, enabling these wheels to be stored in an unused position adjacent the marginal edges of the base. A rigid tubular handle is pivotably connected to the base permitting it to be stored along the marginal edges of the base when not in use. Four co-planer grille-like sides may be erected, removed, or folded down on the uppermost surface of the base providing, when erected, storage space when the base is acting as a cart. A strap, fabricated from a flexible material, converts the base into a dolly when four additional sturdy swivel wheels are bolted to the underside of the base. A plurality of strap retainers are fixedly secured to the marginal edges of the base, which when used in combination with flexible straps, converts the flat base into a luggage carrier.

1 Claim, 4 Drawing Figures

UTILITY CART

BACKGROUND OF THE INVENTION

1. The Field of the Invention

This invention relates to collapsible shopping carts and more particularly to that class which can be additionally connected for use as a dolly or luggage carrier.

2. Description of the Prior Art

The prior art abounds with many disclosures utilizing collapsible techniques for hand carts. U.S. Pat. No. 3,191,959 issued June 29, 1975 to H. W. Heimbruch et al. and U.S. Pat. No. 3,168,328 issued Feb. 2, 1965 to L. F. Hill Sr. and U.S. Pat. No. 3,194,576 issued July 13, 1965 to J. P. Kunkle and U.S. Pat. No. 3,774,929 issued Nov. 27, 1973 to O. M. Stanley all teach a variety of shopping carts, each of whom may have the co-planer storage grilles thereof collapse and fold up so that the cart may occupy a minimum amount of space when not in use. However, each of the aforementioned Patents suffer the common deficiency of restricting the use of the wheeled vehicle described to a cart as opposed to a flat bedded vehicle capable of use as a dolly or luggage carrier as well.

SUMMARY OF THE INVENTION

A primary object of the present invention is to provide a collapsible cart which may be utilized in alternate modes of erection as a dolly or a luggage carrier.

Another object is to provide for relatively light wheels that may be utilized when the apparatus is set up as a cart.

Still another object is to provide storage means facilitating the storage of the relatively light wheels when not in use.

Yet another object is to provide a cart which may have the co-planer walls thereof collapse and store parallel to the base section thereof when not in use.

A further object is to provide dissassembly means enabling the cart walls to be completely removed from the base section when not in use.

Another object is to provide a rigid handle which may be stored on the base section when not in use.

Still another object is to provide luggage strap retaining clips, facilitating the use of luggage straps secured to the base portion when the apparatus is used as a luggage carrier.

Yet another object is to provide mounting facilities for four heavy swivel wheels, converting the base portion into a dolly.

Most collapsible carts, heretofore, employed relatively light frame members to which wheels are attached. The grille portions, as well as the frame members, fold and collapse in most cases, so that the cart may be stored in sensibly a flattened position. Since the handle element is almost universally a part of the frame elements, the plane in which the collapsed apparatus resides invariably includes the wheel elements on one edge of the collapsed structure and the handle portion on the opposed edge thereof. In this condition, the flattened structure has no utility but does have the advantage of occupying a minimum amount of space.

The instant invention utilizes a rigid sturdy base element which is adapted to be maintained parallel to the ground and supported by wheels in modes of use as a cart, luggage carrier, and dolly. The handle portion may be pivoted to a use or storage position without destroying the integrity and strength of the base portion which then may be utilized as a dolly or luggage carrier. Heavier swivel wheels replace the general utility wheels when the cart sides are either removed or folded up so as to store on the uppermost surface of the base portion. A flexible strap, acting as a handle, supplants the rigid handle when the apparatus is utilized as a dolly. A plurality of luggage strap cleats are provided enabling the user to strap luggage on the uppermost surface of the frame when the cart sides are either removed or collapsed.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a rigid frame, preferably fabricated from aluminium, adapted with rectangular marginal edges and fitted with four rotatable wheels pivotably secured to axles which in turn selectively pivot so as to store the wheels in a horizontal position at four points adjacent the marginal edges of the frame. A rigid tubular handle is pivotably secured to two marginal edges of the frame enabling the handle to be stored adjacent the frame marginal edges, when the handle is not in use. Four separably fence-like grille-like elements engage recesses in the frame edges and hook into each other enabling the grilles to be erected into intersecting planer relationship, creating a fence-like structure utilized to confine packages or other articles therein. Holes are located in the floor of the frame to be utilized with bolts to fasten four swivel wheels to the undermost surface of the frame, converting the frame into a dolly thereby. A flexible leather strap is fastened at both free ends to one marginal edge of the frame, creating a loop thereby of the type similarly found on dollys. At least four cleats are fastened to opposed marginal edges of the frame and can be utilized to secure flexible straps to the frame such that the flexible straps clamp luggage tightly to the uppermost lateral surface of the frame.

Figure 1:
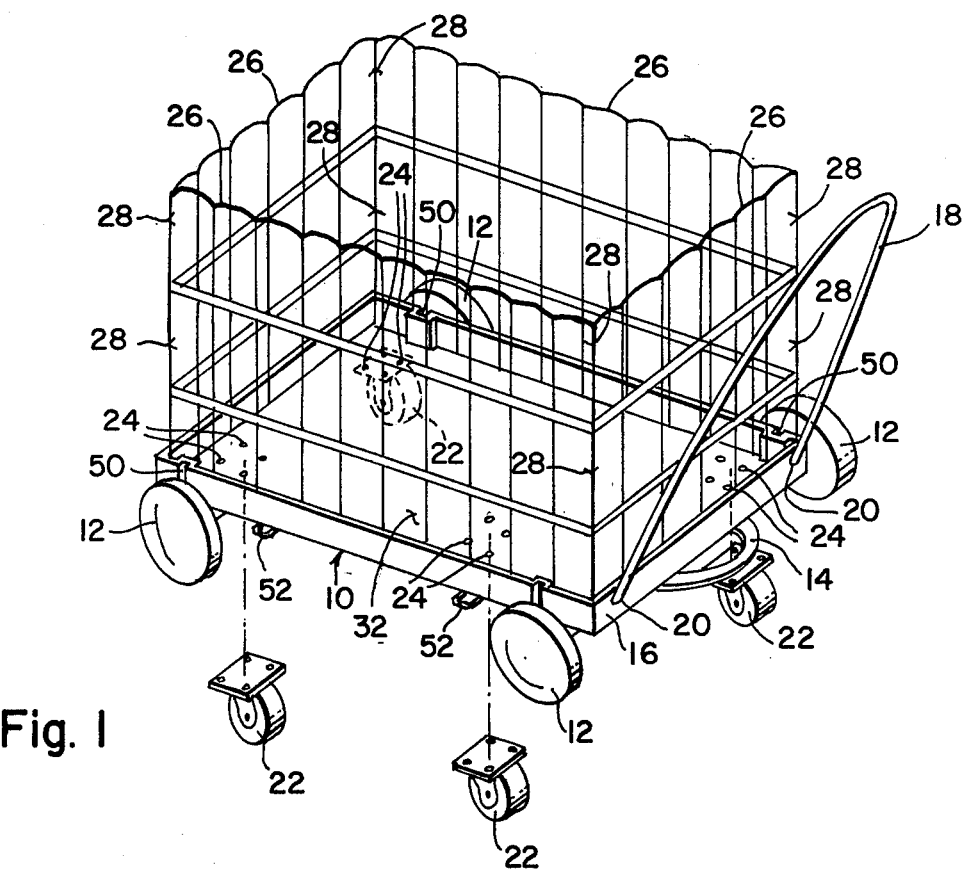
FIG. 1 is a perspective view of the instant invention.

Now referring to the Figures, and more particularly to the embodiment illustrated in FIG. 1 showing a rigid frame 10 to which is attached four collapsible wheels 12. A leather strap 14 is attached to edge 16 of the frame utilizing rivets, not shown, therefor. Handle 18 is pivoted in holes 20 enabling the handle to rotate. Dolly wheels 22 are attached to the underside of the frame utilizing holes 24 therefor in conjunction with bolts, not shown. Fence-like elements 26 are removably affixed to frame 10 and interconnect to each other at adjacent marginal edges utilizing hooks 28. Cleats 52 have openings therein for the retention of flexible straps, not shown, which are utilized to retain luggage on the uppermost lateral surface of floor 32.

Figure 2:
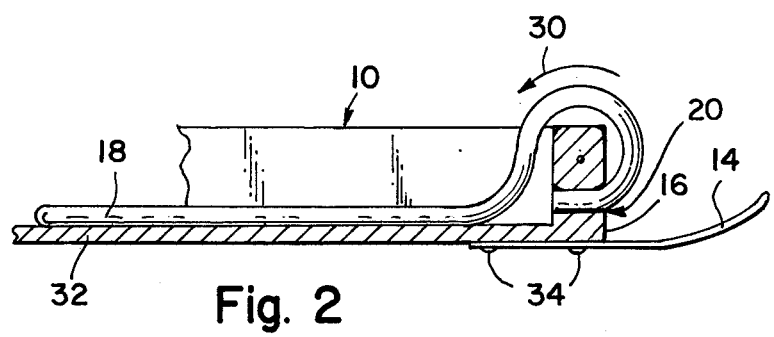
FIG. 2 is a side elevation view of a portion of the instant invention.

FIG. 2 shows handle 18 pivoted around hole 20 in the direction of arrow 30 so as to be stored adjacent the floor 32 of frame 10. Strap 14 is shown secured to floor 32 utilizing rivets 34 therefor.

Figure 3:
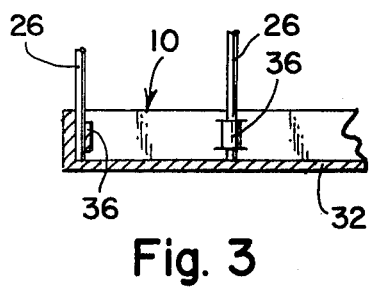
FIG. 3 is a side elevation view of a portion of the instant invention.

FIG. 3 illustrates a portion of frame 10 and a portion of floor 32. Short lengths of hollow tubes 36 are fixedly secured to frame 10 and are used to engage the lowermost portions of fence-like element 26 therein so as to maintain fence-like element 26 in the upright position. Moving fence-like element 26 upwardly disengages the lowermost edges of the fence-like element from tubes 36 and allows the fence-like element to be stored against the uppermost surface of floor 32 or, if desired, to be removed and stored separately therefrom.

Figure 4:
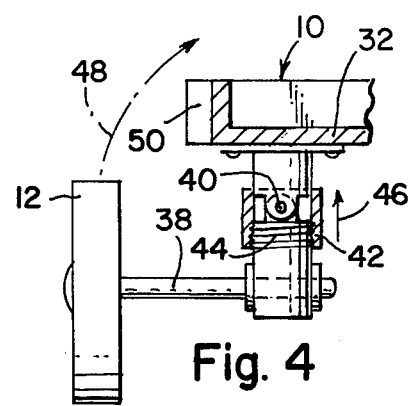
FIG. 4 is a side elevation view of a portion of the instant invention.

FIG. 4 illustrates frame 10 to which is attached wheel 12 by way of axle 38. Pivot 40, in the position shown, is maintained inoperative due to collar 42 being in the lowermost threaded down position. When collar 42 is rotated, it disengages threads 44, enabling the collar to be moved upwardly in the direction of arrow 46. Axle 38 may then pivot about pivot point 40 in the direction of arrow 48 and be stored in slot 50 affixed to the side of frame 10. The peripheral edges of the wheel 12 will then occupy a plane parallel to the plane of the lateral surfaces of floor 32.

One of the advantages is a collapsible cart which may be utilized in alternate modes of erection as a dolly or a luggage carrier.

Another advantage provides for relatively light wheels that may be utilized when the apparatus is set up as a cart.

Still another advantage is storage means facilitating the storage of the relatively light wheels when not in use.

Yet another advantage is a cart which may have the co-planer walls thereof collapse and store parallel to the base section thereof when not in use.

A further advantage provides for disassembly means enabling the cart walls to be completely removed from the base section when not in use.

Another advantage is a rigid handle which may be stored on the base section when not in use.

Still another advantage is luggage strap retaining clips, facilitating the use of luggage straps secured to the base portion when the apparatus is used as a luggage carrier.

Yet another advantage is mounting facilities for four heavy swivel wheels, converting the base portion into a dolly.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

I claim:

1. A utility cart comprising a rectangular rigid base portion, four rotatable wheels, four axles, each of said four axles having one of said four wheels rotatably secured thereto, axle pivot means for pivoting said each of said four axles about a pivot line transverse to the longitudinal axis of said each of said four axles, said axle pivot means pivotably securing said each of said four axles to said base portion, retaining means for selectively preventing said each of said four axles from pivoting about said pivot line, a base surface coextensive with said rigid base portion, at least four removable foraminous, wall-like elements for erecting the lateral surfaces thereof in rectangular relationship perpendicular to said base surface, securing means for interlocking the marginal adjacent edges of said foraminous, wall-like elements to each other, disengagement means enabling said foraminous, wall-like elements to disengage from said rigid base portion and from each other at said adjacent marginal edges thereof, a rigid handle portion pivotably secured to said rigid base portion, a flexible handle portion fixedly secured to said rigid base portion, said axle pivot means comprising, four first rods, one end of each of said four first rods fixedly secured to a lower surface of said base portion, four second rods, one end of each of said four second rods pivotally secured to the other end of an adjacent said each of said four first rods, four collars, said four collars having a plurality of female threads disposed on an inner surface thereof, said each of said four second rods having a plurality of male threads disposed on an external surface thereof adjacent said one end thereof, each of said four collars being disposed rotatably secured to said plurality of male threads, wherein said plurality of female threads have a greater internal diameter than the outside diameter of said each of said four first rods at a location adjacent said other end thereof, said each of said four axles being disposed fixedly secured to an adjacent said each of said four second rods and extending radially outwardly therefrom.

* * * * *